United States Patent
Volftsun et al.

(12) 
(10) Patent No.: US 11,378,433 B2
(45) Date of Patent: Jul. 5, 2022

(54) MANIFOLD STYLE METERING MECHANISM FOR USE WITH BEVERAGE DISPENSING SYSTEM

(71) Applicant: Sestra Systems, Inc., Sterling, VA (US)

(72) Inventors: Lev Volftsun, Sterling, VA (US); Deepak Harathi, Sterling, VA (US)

(73) Assignee: SESTRA SYSTEMS INC, Sterling, VA (US)

( * ) Notice: Subject to any disclaimer, the term of this patent is extended or adjusted under 35 U.S.C. 154(b) by 0 days.

(21) Appl. No.: 16/744,263

(22) Filed: Jan. 16, 2020

(65) Prior Publication Data

US 2020/0166396 A1 May 28, 2020

Related U.S. Application Data

(63) Continuation-in-part of application No. 15/487,488, filed on Apr. 14, 2017, now Pat. No. 9,926,181, and
(Continued)

(51) Int. Cl.
*G01F 11/06* (2006.01)
*B67D 1/08* (2006.01)
(Continued)

(52) U.S. Cl.
CPC .............. *G01F 11/06* (2013.01); *B67D 1/0888* (2013.01); *B67D 1/1234* (2013.01); *G01D 5/145* (2013.01)

(58) Field of Classification Search
CPC .. B67D 1/0888; B67D 1/0041; B67D 1/1234; B67D 1/1231; G01D 5/142; G01D 5/145;
(Continued)

(56) References Cited

U.S. PATENT DOCUMENTS 3,283,957 A * 11/1966 Henderson ............. B67D 7/743
222/57
3,370,759 A * 2/1968 Johansson ............. B67D 1/104
222/249
(Continued)

OTHER PUBLICATIONS https://cellarcraftuk.com/15-reasons-clean-beer-lines.

*Primary Examiner* — Vishal Pancholi
*Assistant Examiner* — Robert K Nichols, II
(74) *Attorney, Agent, or Firm* — Gugliotta & Gugliotta LPA

(57) ABSTRACT

An automated beverage dispenser include a metering manifold that contains a pair of mating manifold blocks forming as a generally rectangular cuboid element forming a minimized volume manifold block. A fluid conduit system, a sensor control system and a valve and actuator system are incorporated in and on the minimized volume manifold block. The fluid conduit system comprises a series of linear, interacting fluid channels including a central linear conduit containing a magnetic piston and forming an operative portion of a metering mechanism for providing a metered discharge of beer or beverage between the bulk storage and a tap or spigot in a manner that provides for a beverage specific controlled metered pour into a beverage container. The instant abstract is neither intended to define the invention disclosed in this specification nor intended to limit the scope of the invention in any way.

20 Claims, 5 Drawing Sheets

Related U.S. Application Data a continuation-in-part of application No. 15/424,478, filed on Feb. 3, 2017, now Pat. No. 10,167,183, and a continuation-in-part of application No. 15/332,117, filed on Oct. 24, 2016, now Pat. No. 10,294,092, and a continuation-in-part of application No. 14/686,820, filed on Apr. 15, 2015, now Pat. No. 10,125,002.

(60) Provisional application No. 62/794,009, filed on Jan. 18, 2019.

(51) Int. Cl.
*G01D 5/14* (2006.01)
*B67D 1/12* (2006.01)

(58) Field of Classification Search
CPC .......... G01F 11/06; G01F 11/10; G01F 11/14; G01F 11/16; G01F 11/36; G01F 11/38; G01F 3/16
USPC .................... 222/52, 129–137, 145.5–145.6; 137/98–101, 109–110
See application file for complete search history.

(56) References Cited

U.S. PATENT DOCUMENTS

| | | | | |
|---|---|---|---|---|
| 3,565,287 A * | 2/1971 | Johnston | ................ | G01F 11/04 222/26 |
| 4,043,198 A * | 8/1977 | Stillwell | .................. | G01F 3/16 73/242 |
| 4,240,291 A * | 12/1980 | Andersson | ................ | G01P 5/18 73/239 |
| 4,354,806 A * | 10/1982 | McMillin | .............. | B01F 3/0473 417/393 |
| 4,886,190 A * | 12/1989 | Kirschner | ............ | B67D 1/1218 222/57 |
| 4,901,886 A * | 2/1990 | Kirschner | ............ | B67D 1/1234 222/1 |
| 5,121,855 A * | 6/1992 | Credle, Jr. | ........... | B67D 1/0044 137/99 |
| 5,381,926 A * | 1/1995 | Credle, Jr. | ........... | B67D 1/0032 222/1 |
| 6,347,934 B1 * | 2/2002 | Andersen | ............. | B29C 31/063 425/557 |
| 6,435,375 B2 * | 8/2002 | Durham | ................ | B67D 1/122 222/129.1 |
| 6,450,369 B1 * | 9/2002 | Heyes | ................. | G05D 11/132 222/129.1 |
| 6,676,387 B1 * | 1/2004 | Penn | ...................... | G01F 11/04 222/129.1 |
| 7,287,671 B2 * | 10/2007 | Morrow, Sr. | ........ | B67D 1/0054 222/129.1 |
| 8,479,955 B2 * | 7/2013 | Vesborg | ............... | B67D 1/0082 222/146.6 |
| 9,926,181 B1 * | 3/2018 | Volftsun | ............... | B67D 1/1256 |
| 10,125,002 B2 | 11/2018 | Volftsun | | |
| 10,167,183 B1 | 1/2019 | Volftsun et al. | | |
| 10,294,092 B2 * | 5/2019 | Volftsun | ............... | B67D 1/0884 |
| 10,294,093 B1 | 5/2019 | Volftsun et al. | | |
| 2013/0333464 A1 * | 12/2013 | Cardelius | ................ | G01F 3/16 73/239 |

\* cited by examiner

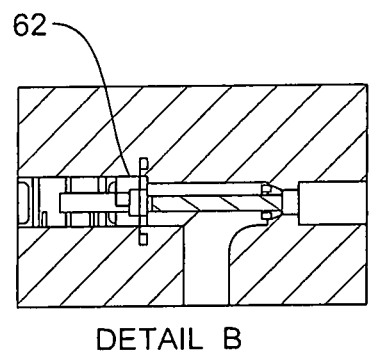
DETAIL B
FIG. 6
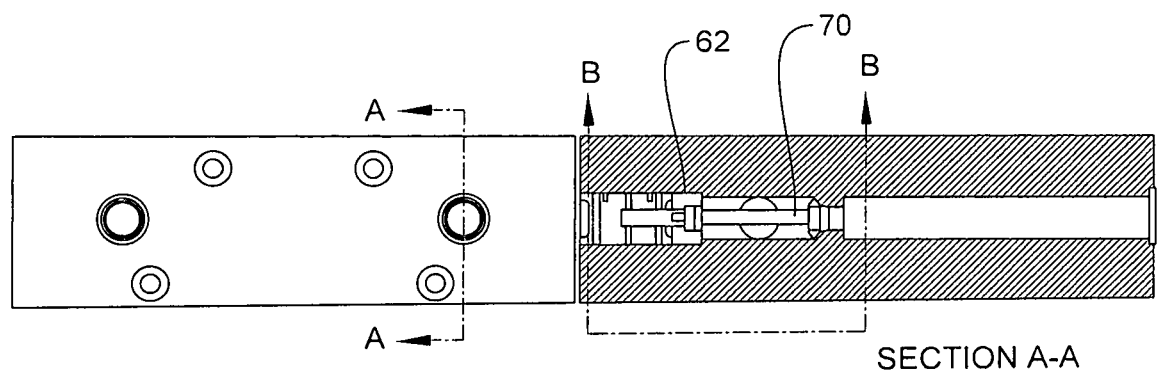
FIG. 7
SECTION A-A
FIG. 8
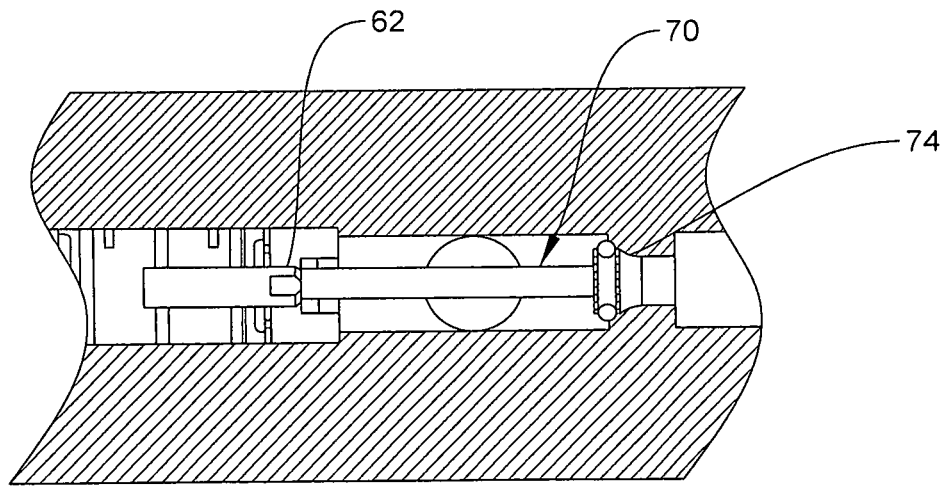
DETAIL B
SCALE 4 : 1
FIG. 9

MANIFOLD STYLE METERING MECHANISM FOR USE WITH BEVERAGE DISPENSING SYSTEM

RELATED APPLICATIONS

The present invention claims the benefit of U.S. Provisional Application 62/794,009, filed Jan. 17, 2019, which is incorporated by reference as if fully rewritten herein.

BACKGROUND OF THE INVENTION

1. Field of the Invention

The present invention relates generally to a system and method for the automated metering, dispensing, reporting and tracking of dispensing beverages in hospitality or other commercial settings and, more particularly, to a manifold style metering mechanism adapted for use with carbonated beverages such as beer.

2. Description of the Related Art

In automated beverage dispensing systems, bulk alcoholic beverages such as beer, wine or cocktails have been successfully dispensed in a manner that meters, tracks, controls and continuous dispenses in a faster and more accurate manner. Examples include the teachings of U.S. Pat. Nos. 10,294,092, 10,167,183, and 10,125,002, all issued in the name of the present inventor and incorporated by reference as if fully rewritten herein. Such systems prevent oxidation of the beverage contents while allowing for necessary and routine delivery line cleaning through several mechanisms.

However, while such systems can and have been adapted for use with carbonated alcoholic beverages such as beer, sparkling wine or mixed cocktails, it has been found that a significant problem occurs when used in conjunction with carbonated alcoholic beverages, such as beer or sparkling wines. In such applications the maintenance of system pressure is increasingly important since as system pressure is allowed to drop the carbon dioxide gas will no longer remain within solution, resulting in a flat beverage. Further, if the system pressure is not maintained throughout the process, any ultimately dispensed fluid becomes excessively and unacceptably foamy. Further still, the presence of yeast, mold, bacteria and other hazards in combination with the nature of such beverages, especially beer, will require regular cleaning using both caustic and acid line cleaners which can be very dangerous if not handled and used properly. As a result, such beverage dispensing systems should both limit the creation of turbulent flow within as well as minimize any trapped volumes that would either foster the growth of hazards or make flushing of dangerous cleaning chemical less than complete.

Consequently, a need exists for such improvements in the metering mechanism for use with such beverage dispensing systems.

SUMMARY OF THE INVENTION

It is thus an object of the present invention to provide for a metering mechanism for use with beverage dispensing systems having a more efficient, optimized fluid flow path.

It is a feature of the present invention to provide such a metering mechanism formed in a manifold style assembly.

The present application provides an automated beverage dispenser for dispensing a beverage into a drinking vessel. The automated beverage dispenser may include a metering mechanism in fluid communication with a beverage supply in operative connection with said bulk storage and distribution system. The metering system provides a specific selected volumetric discharge in fluid communication with a tap or spigot in a manner that provides for the beverage to be discharged in a controlled and metered manner into a drinking container that is coordinated with the beverage being discharged. The metering mechanism includes a first manifold block and a second manifold block each formed as a generally rectangular cuboid element having a mating interface where said first manifold block and said second manifold block are affixed collinearly along a lateral centerline such as to form a minimized volume manifold block assembly. A fluid conduit system is formed within the manifold assembly. A sensor control system and a valve and actuator systems are incorporated in and on the manifold assembly.

The fluid conduit system comprises a series of linear, interacting fluid channels forming an external conduit circuit and a central linear conduit. The central linear conduit containing a magnetic piston that reciprocates to form an operative portion of a metering mechanism for metering the discharge of beverage with a series of known volumetric discharges. The reciprocating piston, retained within the cylindrical metering chamber, slides between opposed access inlets or outlets in a manner such that the conduits are continuously hydrodynamically coupled, and movement of the beverage caused the piston to reciprocate. The measurement of the piston reciprocation is thereby used to measure a metered output. An uninterrupted continuous output flow of beverage fluid is provided by selectively operating input control mechanisms and output control mechanisms in a sequentially overlapping manner to create a smooth, continuous fluid flow to a dispenser.

An advantage of the present invention provides a metering mechanism for use in a beverage dispensing system that minimized fluctuations in pressure within the beverage during the metering function.

Another advantage of the present invention to maintain sufficient pressure throughout the dispensing system and metering process to prevent the dispensed carbonated beverages from becoming unacceptably foamy.

Yet another advantage of the present invention is to meter carbonated beverages in a manner that minimized flow disturbances, such as turbulence, that would result in degassing within the flowing beverage.

It is a further advantage of the present invention to provide a metering mechanism that minimizes any trapped volumes during dispensing or cleaning.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6 is a cross sectional detail view taken along line B-B of FIG. 5;

FIG. 7 is a right side elevational schematic of the manifold 10;

FIG. 8 is a cross sectional view taken along line A-A of FIG. 7;

FIG. 9 is a cross sectional detail view taken along line B-B of FIG. 8;

DESCRIPTION OF THE PREFERRED EMBODIMENTS

Figure 1:
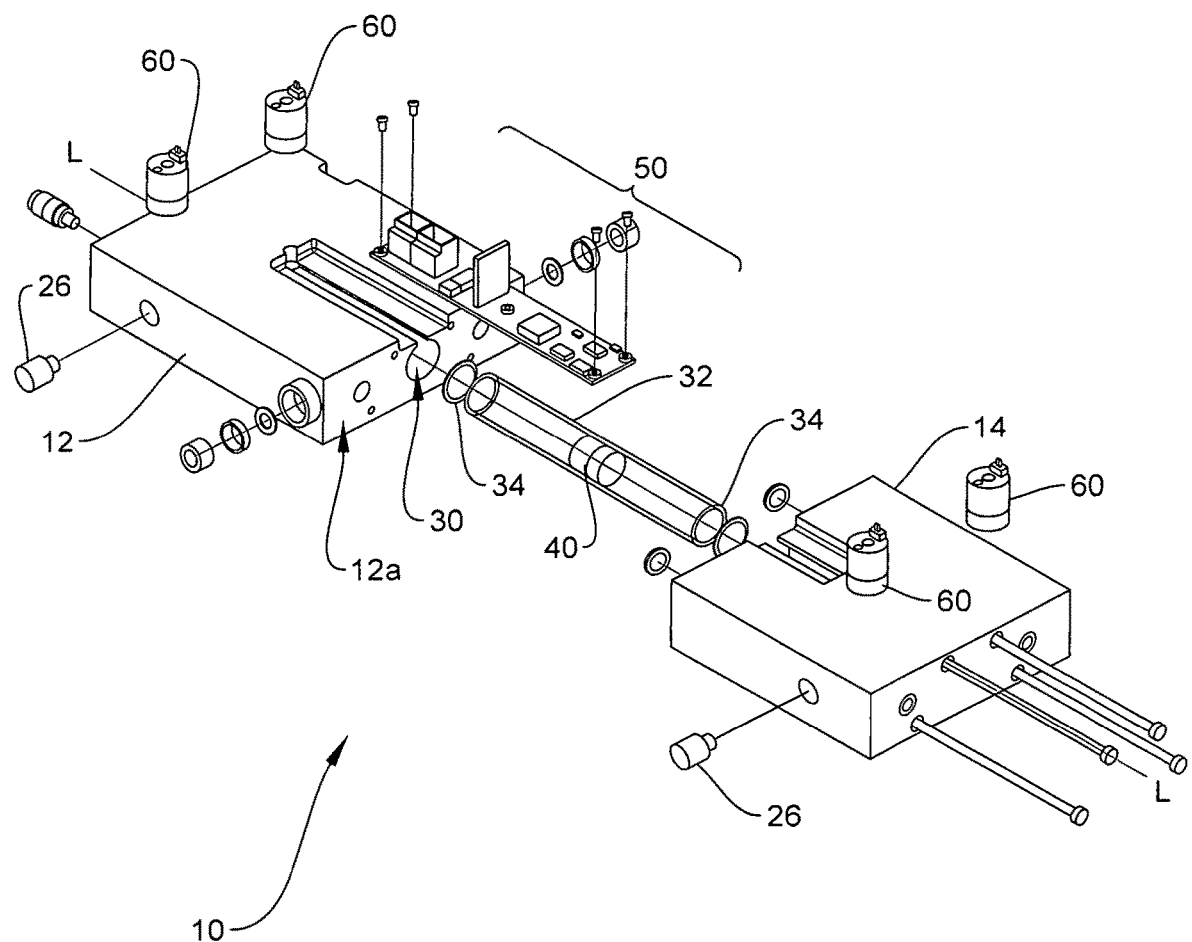
FIG. 1 is an exploded right front perspective view of a metering mechanism according to an exemplary preferred embodiment of the present invention for use with a carbonated beverage dispensing system.
Figure 2:
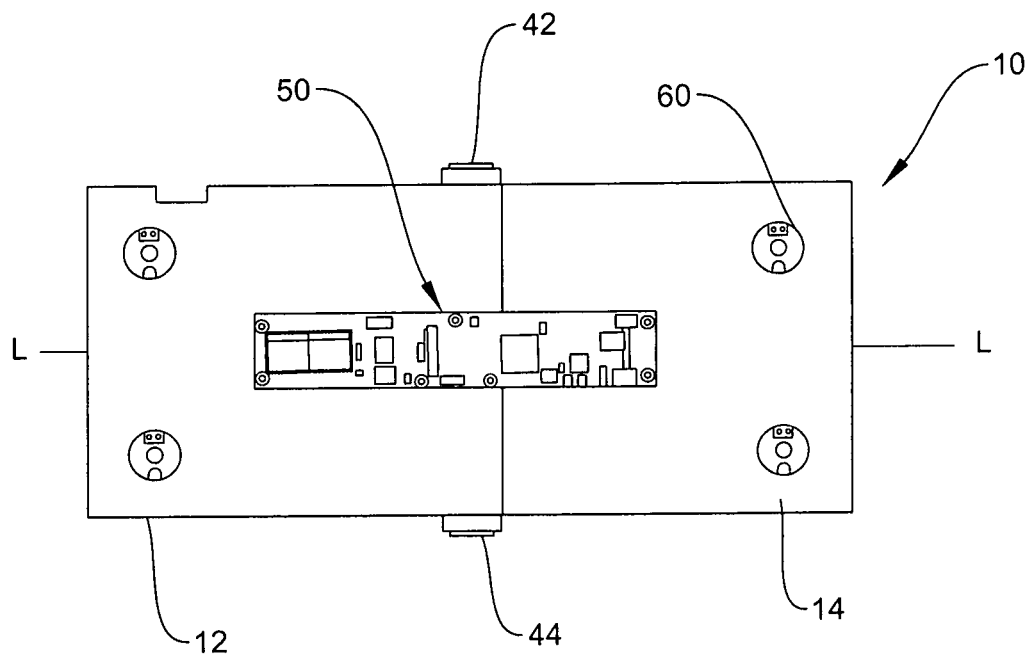
FIG. 2 is a top plan view thereof.
Figure 3:
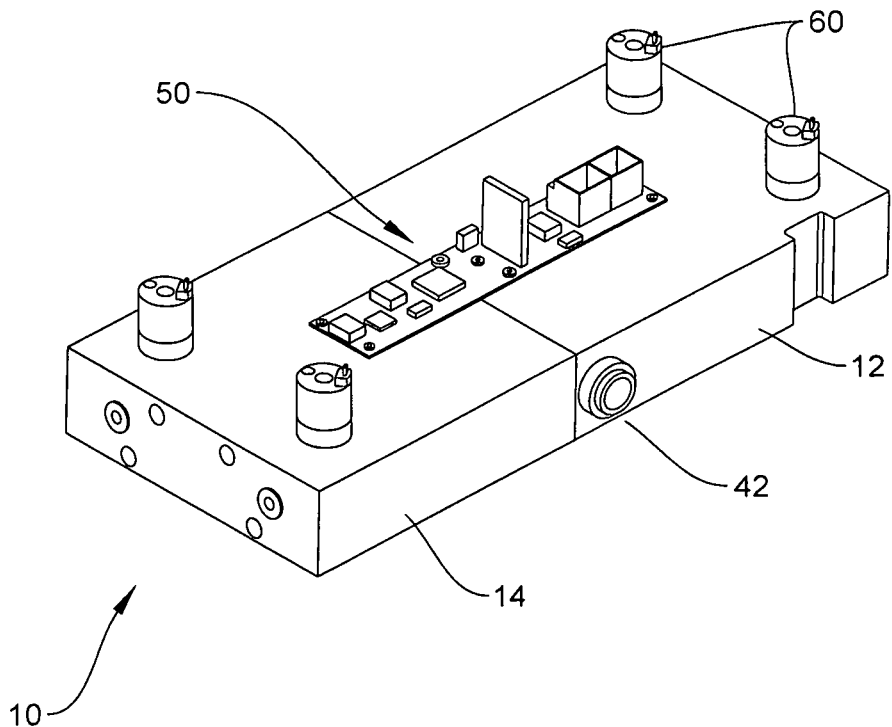
FIG. 3 is left front perspective view thereof.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. It should be further apparent to a person having ordinary skill in the relevant art, in light of the present teachings, that the discussed enablement being described for use with bulk wine should be considered equivalent for use with any other beverages.

For purposes of the present disclosure the terms "a" and "an" herein do not denote a limitation of quantity, but rather denote the presence of at least one (1) of the referenced items. Further for purposes of the present disclosure the terms "in", "out", "left" "right", "up" or "down" are all spacial and functionally relative directions used to aid in the description to best explain the principles of the invention and its practical application, and to aid others skilled in the art to best utilize the invention and are not meant to be limiting to any particular orientation. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Referring now in conjunction with FIG. 1-6, a metering mechanism, generally noted as 10, is shown according to an exemplary preferred embodiment of the present invention for use with a carbonated beverage dispensing system. The metering mechanism 10 includes a first manifold block 12 and a second manifold block 14. Each manifold block 12, 14 is formed as a generally rectangular cuboid element that each interfaces in a mating, sealed manner with each other at an inner mating surface 12a, 14a, respectively. Each rectangular cuboid element 12, 14 is affixed collinearly along a lateral centerline "c/L" such as to form the metering mechanism 10 as a minimized volume manifold block. The manifold metering mechanism thereby further forms essentially: a fluid conduit system; a sensor control system 50; and a valve and actuator system.

Figure 5:
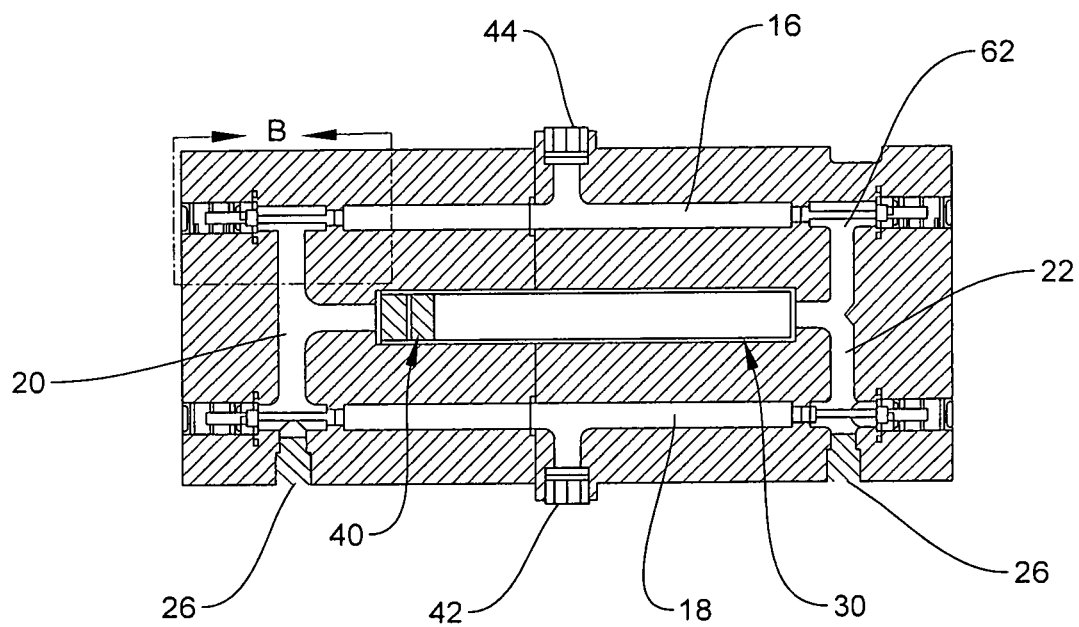
FIG. 5 is a cross sectional view taken along line A-A of FIG. 4.
Figures 10A, 10B:
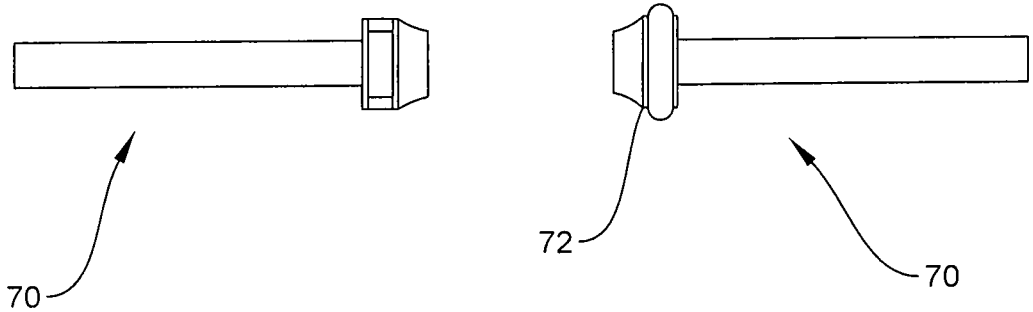
FIG. 10a is a detail top plan view of a poppet spool actuator piston 70 for use therewith.
FIG. 10b is a detailed dimensional plan view thereof.

As shown most clearly in conjunction with FIG. 5, fluid conduit system is formed within each manifold block 12, 14 as series of linear, interacting fluid channels including an upper fluid conduit 16 opposite a lower fluid conduit 18 and a left fluid conduit 20 opposite a right fluid conduit 22. The upper and lower fluid conduits 16, 18 are formed as a contiguous outer circuit spanning through each manifold block 12, 14.

The formation of the manifold is shown in a lateral orientation in which the inner mating surfaces 12a, 14a is shown such at to divide the manifold generally into 'left' and 'right' halves. In such a configuration the conduits may be machined by 'drilling' in similar conventional machining techniques. Any such method of machining should be used without limitation to any particular machining operation and should broadly include any other milling, machining or other process capable of obtaining a functionally broadly equivalent result. Further, in such an orientation the left and right fluid conduits 20, 22 may thereby be formed, one within each manifold block 12, 14 respectively so as to form a continuous hydraulic circuit within the metering mechanism. Each left or right conduit 20, 22 merely needs to connect the upper and lower fluid channels 16, 18 and may be similarly formed by drilling or the equivalent from one side of the respective manifold block 12, 14 with the access orifice closed via a work port plug 26.

Figure 11:
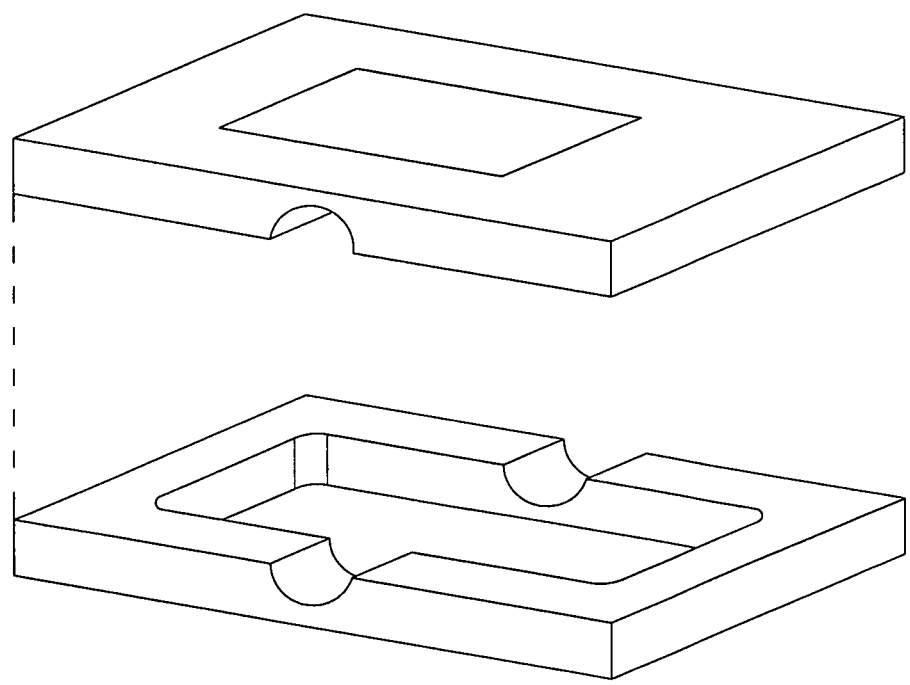
FIG. 11 is a partially exploded perspective schematic representation of an alternate orientation for the metering mechanism of FIG. 1.

It should be considered that such a 'left/right' orientation is merely exemplary and is provided merely for purposes of enabling a preferred embodiment within a best mode as known at the time of the present disclosure. However, is should be apparent to one having ordinary skill in the relevant art, and is the intention of the present invention that the configuration, orientation and formation of the manifold block 12, 14 may be formed differently while still being functionally equivalent. By way of example, and not meant as a limitation, the formation of the manifold may be provided in a planar orientation in which the inner mating surfaces 12a, 14a would divide the manifold generally into 'top' and 'bottom' halves. As best shown schematically in conjunction with FIG. 11, in manifold sections 12, 14 may be formed of conventional molding techniques such as to configuration the conduits as molded cavities within each manifold "top" or "bottom", respectively. Further, in such an orientation the left and right fluid conduits 20, 22 may thereby be formed, one half within each manifold block 12, 14 respectively so as to form a continuous hydraulic circuit within the metering mechanism when the manifold blocks 12, 14 are mated together.

In either orientation, a central linear conduit 30 may be formed in a similar manner spanning through each manifold block 12, 14 to hydraulically connect the left and right fluid conduits 20, 22 and forming a third channel parallel to and between the upper charnel 16 and lower channel 18. A stainless-steel cylinder 32 may be formed and positioned as a continuous sleeve liner within the central linear conduit 30. The cylindrical sleeve 32 may be sealed about each open end with an "O"-ring, gasket or other seal 34 to form a hydraulically sealed system when assembled. Similar resilient seals may further be sealed between aligning and connecting fluid channels throughout the system 10.

An inlet port 42 and an outlet port 44 are oppositely formed to provide access to or egress within the fluid channels within the manifold 10. The inlet 42 and outlet 44 are operatively coupled to communicate with a beverage supply (not shown) in further operative connection with the bulk storage and distribution system for carbonated beverages such as, preferably, beer (also not shown). The magnetic piston 40 within the cylinder 32 forms one operative portion of a metering mechanism for providing a metered discharge of beer or beverage between the bulk storage and a tap or spigot in a manner that provides for a beverage specific controlled metered pour into a beverage container. Such a beverage metering, pouring, controlling and monitoring/reporting system may be of the type described by, anticipated within or equivalent to those described in the above referenced of U.S. Pat. Nos. 10,294,092, 10,167,183, and 10,125,002, all issued in the name of the present inventor and all of which are incorporated by reference as if fully rewritten herein. In a preferred embodiment the cylinder the present invention is shown in greater detail. The metering cylinder 32 and piston 40 combination function as a line pressure powered bi-directional dispenser by redirecting the pressure from one end of the chamber to the other end. Such a chamber 32 allows for accurate, repeatable metering, utilizing and preserving line pressure without the inclusion of an additional pumping device.

The sensor control system 50 is in operative interaction with the piston 40 for providing piston location sensor data input to an electronic control system in connection with the bulk storage and distribution system. The metering mechanism 10 provides for a metered discharge in fluid communication with the tap or spigot in a manner that provides for a beverage specific controlled metered pour into a beverage container. Measurement of a location of the piston 40 within the cylinder allows for accurate, repeatable metering, utilizing and preserving line pressure without the inclusion of an additional pumping device.

The sensor system 50 may provide one or more location sensors for providing electronic control signals that corresponds to piston location to a microprocessor controller. The sensor system 50 uses a Line Control Board (LCB) that detects a piston location inside a metering conduit. A plurality of magnetic sensors (i.e., Hall effect sensors) is positioned at equal intervals and in the same plane collinear with the movement of a magnetic piston within the metering mechanism conduit. The plurality of Hall effect sensors detects the piston location inside the cylinder. A control signal may further be provided as to include wireless communication capability, further integrated with or on the LCB, to communicate between a remotely positioned metering system 10 and a centrally located control system. Further communication may be provided with a standard PC or smartphone using the wireless protocol (such as Bluetooth, Wi-Fi, Internet, etc.). Bulk beverages from a number of sources may be metered upon demand as urged through the metering chamber 32 of an identified volume by a single system pressure generated from fluid communication with the bulk beverage container.

As should be apparent to those having ordinary skill in the relevant art, in light of the present invention, the LCB functions are not limited to finding the piston location inside the cylinder using Hall sensors. Additionally, when the LCB detects that the piston is close to the end of the cylinder (either through measurement or determined algorithmically as taught in U.S. Pat. No. 10,167,183) it opens-closes pairs of valves reversing the direction of the piston and beverage inside the cylinder. Further, LCB performs these series of tasks repeatedly based on a command from Central Controller. By way of example, when the Central Controller sends a command to LCB: "dispense 10 oz. of beverage", the LCB will open-close pairs of valves ten (10) times and track piston location during each of 10 piston runs along the cylinder. When 10 oz. has been dispensed LCB closes all four valves and reports to Central Controller that the command has been successfully completed.

Figure 4:
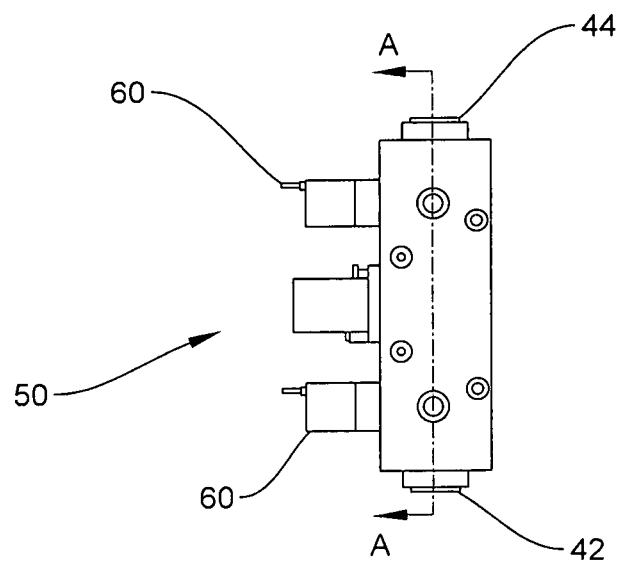
FIG. 4 is a right side elevational view thereof.

Referring now further in greater detail in conjunction with FIG. 4-5, the chamber 40 is provided in the form of a container having a selected, defined internal volume 42. The chamber 40 is shown embodied as a cylindrical container; however, it should be noted that such a shape and configuration are not intended to be limiting to the present invention. As will be described in greater detail below, according to an aspect of the present invention the defined volume 42 may be equal to the volume of a desired beverage pour. Further, according to another aspect of the present invention the defined volume 42 may be equal to a fractional component of the volume of a desired beverage pour, thereby facilitating its use with mixed or blended drinks. Further still, according to yet another aspect of the present invention the defined volume 42 may be equal to a multiple of the volume of a desired beverage pour, thereby allowing for multiple dispenses from each reciprocating cycle.

The valve and actuator system provides a number of pneumatic or electronic actuators 60 that open and close the beer flow path. As shown best in conjunction with FIG. 5 through FIG. 10, the actuators 60 urge the actuator piston 62 and opens the beer flow path. The actuator piston 62 threads or otherwise mates to a poppet spool 70 that forms a valve plug 72, with the corresponding valve seat 74 formed at the end terminus of each upper and lower fluid conduits 16, 18.

Given an intended use is the metering and dispensing of carbonated beverage, one aspect of the present invention is to limit the creation of turbulent flow within the system. While maintenance of system pressure is one key parameter that must be achieved in order to prevent degassing, it has also been found that various other physical modifications may be utilized in order to minimize foaming associated with such degassing. The use of a valve plug 72 and corresponding valve seat 74 that maintain laminar flows and prevent tortuous fluid paths are found to be beneficial. Such laminar flow valves and location of valving away from corners or changes in the plane of fluid flow, as well as the use of curvilinear flow patterns within the flow conduits, are further beneficial. As shown best in conjunction with FIG. 6, the absence of harsh direction changes and the use of curved flow transitions are further found to be beneficial.

As described above, the metering mechanism 10 of the described teachings provide for a fluid communication input from the beverage supply, and a fluid communication discharge to a spigot or tap. The provided manifold design is compact and efficient, eliminating various three-way switching valves and flow splitters.

2. Operation of the Preferred Embodiment

The actuators 60, in de-energized state, keep the beer flow path closed. When the pour cycle is started, two diagonally opposite pneumatic valves are opened to let air into the actuators. The air retracts the actuator piston 62 and opens the beer flow path. The beer enters flows through the valve into the cylinder 32 and pushes the piston 40. The beer on the other side of the piston 40 is then pushed out of the cylinder 32 through the valve that is diagonally opposite. Once the piston reaches the end of the stroke, the cycle is repeated with the flow reversed using the other two valves.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar case law or subsequent precedent should not be made if any future claims are added or amended subsequent to this Patent Application.

What is claimed is:

1. A dispensing and pour control system for a regulated beverage comprising:
    a bulk storage and distribution system for a pressurized beverage;
    a metering mechanism in fluid communication with a beverage supply in operative connection with said bulk storage and distribution system, said metering mechanism for providing a specific selected volumetric discharge in continuous hydrodynamic fluid communication with a tap or spigot in a manner that provides for said beverage to be discharged in a series of uninterrupted specific selected volumetric discharges each in a controlled and metered manner as a continuous and uninterrupted fluid flow into a drinking container that is coordinated with the beverage being discharged;
    said metering mechanism further comprising:
        a first manifold block and a second manifold block formed as a generally rectangular cuboid element having a mating interface where said first manifold block and said second manifold block are affixed collinearly along a lateral centerline such as to form a minimized volume manifold block;
        a fluid conduit system;
        a sensor control system; and
        a valve and actuator system;
    wherein said metering mechanism operatively utilizes pressure from said bulk storage as a motive force while maintaining a system pressure within said storage and distribution system between dispensing cycles.

2. The dispensing and pour control system for a regulated beverage of claim 1, wherein said fluid conduit system comprises a series of linear, interacting fluid channels including:
    an upper fluid conduit opposite a lower fluid conduit;
    a left fluid conduit opposite a right fluid conduit;
    the upper and lower fluid conduits each separately formed as a conduit spanning through the first manifold block and the second manifold block;
    the left fluid conduit formed in the first manifold block in fluid communication between the upper fluid conduit and the lower fluid conduit;
    the right fluid conduit formed in the second manifold block in fluid communication between the upper fluid conduit and the lower fluid conduit;
    a central linear conduit hydraulically connecting the left and right fluid conduits;
    a cylindrical continuous sleeve liner within the central linear conduit;
    a magnetic piston within the sleeve liner forming an operative portion of a metering mechanism for providing a metered discharge of beer or beverage between the bulk storage and a tap or spigot in a manner that provides for a beverage specific controlled metered pour into a beverage container.

3. The dispensing and pour control system for a regulated beverage of claim 1, wherein said sensor control system is in operative interaction with the piston in a manner providing piston location sensor data input to an electronic control system in connection with the bulk storage and distribution system.

4. The dispensing and pour control system for a regulated beverage of claim 3, wherein measurement of a location of the piston within the central linear conduit allows for accurate, repeatable metering while utilizing and preserving line pressure without the inclusion of an additional pumping device.

5. The dispensing and pour control system for a regulated beverage of claim 4, wherein said sensor system further comprises a plurality of hall effect sensors provided on a Line Control Board (LCB) that detect the piston location inside the central linear conduit.

6. The dispensing and pour control system for a regulated beverage of claim 2, wherein said valve and actuator system comprises:
    a first pair of pneumatic actuators for alternately opening and closing a first flow path along the upper fluid conduit; and
    a second pair of pneumatic actuators for alternately opening and closing a second flow path along the lower fluid conduit.

7. The dispensing and pour control system for a regulated beverage of claim 6, wherein each pneumatic actuator further comprises:
- an actuator piston operative linearly parallel to the lateral centerline; and
- a poppet spool mating to a terminus of and collinear with the actuator piston.

8. A method of utilizing a dispensing and pour control system of claim 7 and comprising the steps:
- a. actuating two diagonally opposite pneumatic actuators to let air into the actuators, retracting connected actuator pistons and opens a flow path;
- b. flowing the regulated beverage through the open flow path valve into the central linear conduit to move the piston where the beverage on the other side of the piston is urged out of the central linear conduit through the valve that is diagonally opposite.

9. The method of claim 8, further comprising the step:
- c. at the end of a stroke, repeating steps a and b with the flow reversed using two oppositely diagonal pneumatic actuators.

10. The dispensing and pour control system for a regulated beverage of claim 2, wherein said sensor control system is in operative interaction with the piston in a manner providing piston location sensor data input to an electronic control system in connection with the bulk storage and distribution system.

11. The dispensing and pour control system for a regulated beverage of claim 10, wherein measurement of a location of the piston within the central linear conduit allows for accurate, repeatable metering while utilizing and preserving line pressure without the inclusion of an additional pumping device.

12. The dispensing and pour control system for a regulated beverage of claim 11, wherein said sensor system further comprises a plurality of hall effect sensors provided on a Line Control Board (LCB) that detect the piston location inside the central linear conduit.

13. The dispensing and pour control system for a regulated beverage of claim 10, wherein said valve and actuator system comprises:
- a first pair of pneumatic actuators for alternately opening and closing a first flow path along the upper fluid conduit; and
- a second pair of pneumatic actuators for alternately opening and closing a second flow path along the lower fluid conduit.

14. The dispensing and pour control system for a regulated beverage of claim 13, wherein each pneumatic actuator further comprises:
- an actuator piston operative linearly parallel to the lateral centerline; and
- a poppet spool mating to a terminus of and collinear with the actuator piston.

15. A method of utilizing a dispensing and pour control system of claim 14 and comprising the steps:
- a. actuating two diagonally opposite pneumatic actuators to let air into the actuators, retracting connected actuator pistons and opens a flow path;
- b. flowing the regulated beverage through the open flow path valve into the central linear conduit to move the piston where the beverage on the other side of the piston is urged out of the central linear conduit through the valve that is diagonally opposite.

16. The method of claim 15, further comprising the step:
- c. at the end of a stroke, repeating steps a and b with the flow reversed using two oppositely diagonal pneumatic actuators.

17. A dispensing and pour control system for a regulated beverage having a bulk storage and distribution system for a pressurized beverage and a metering mechanism in fluid communication with a beverage supply in operative connection with said bulk storage and distribution system, said metering mechanism for providing a specific selected volumetric discharge in fluid communication with a tap or spigot in a manner that provides for said beverage to be discharged in a controlled and metered manner into a drinking container that is with coordinated the beverage being discharged, said metering mechanism further comprising:
- a manifold block formed of two mating and sealing block elements as such as to form a minimized volume manifold block;
- a fluid conduit system formed within the manifold block;
- a metering piston formed within the manifold block and in fluid communication with the fluid conduit system;
- a sensor control system in communication with the metering piston identifying a piston location and a piston speed; and
- a valve and actuator system in operational control of flow within the fluid conduit system;

wherein said metering mechanism operatively utilizes pressure from said bulk storage as a motive force while maintaining a system pressure within said storage and distribution system between dispensing cycles.

18. The dispensing and pour control system of claim 17, wherein said fluid conduit system comprises a series of linear, interacting fluid channels including:
- an upper fluid conduit opposite a lower fluid conduit;
- a left fluid conduit opposite a right fluid conduit;
- the upper and lower fluid conduits each separately formed as a conduit spanning through the first manifold block and the second manifold block;
- the left fluid conduit formed in the first manifold block in fluid communication between the upper fluid conduit and the lower fluid conduit;
- the right fluid conduit formed in the second manifold block in fluid communication between the upper fluid conduit and the lower fluid conduit;
- a central linear conduit hydraulically connecting the left and right fluid conduits;
- a cylindrical continuous sleeve liner within the central linear conduit;
- a magnetic piston within the sleeve liner forming an operative portion of a metering mechanism for providing a metered discharge of beer or beverage between the bulk storage and a tap or spigot in a manner that provides for a beverage specific controlled metered pour into a beverage container.

19. The dispensing and pour control system of claim 18, wherein said sensor control system comprise:
- a Line Control Board (LCB) supporting a plurality of Hall effect sensors positioned at equal intervals and in a same plane collinear with the movement of a magnetic piston within the metering mechanism conduit;
- said plurality of Hall effect sensors detect the piston location inside the cylinder and said LCB provides a control to communicate with and controls the dispensing and pour control system;

wherein said sensor control system is in operative interaction with the piston in a manner providing piston location sensor data input to an electronic control system in connection with the bulk storage and distribution system.

20. In the dispensing and pour control system of claim 17, further comprises:

said two mating and sealing block elements are formed of as molded members forming the conduits as molded cavities within each manifold block element so as to form a continuous hydraulic circuit within the metering mechanism when the manifold blocks are mated together.

* * * * *